April 8, 1958              B. LAGERSTROM              2,829,684
SAW BLADE WITH HARDENED TEETH
Filed Feb. 16, 1954
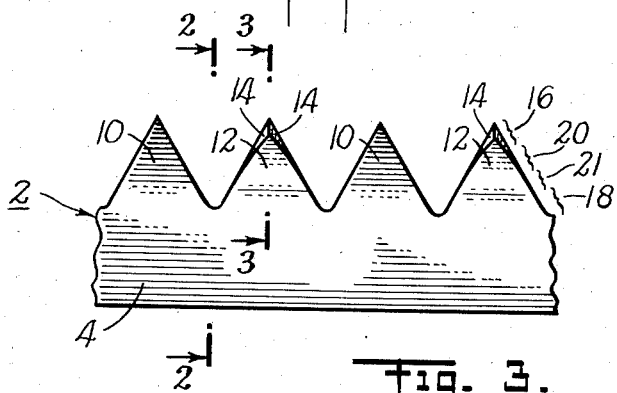
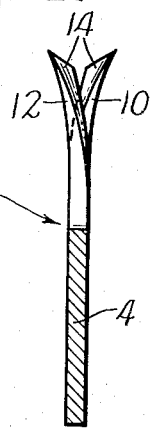
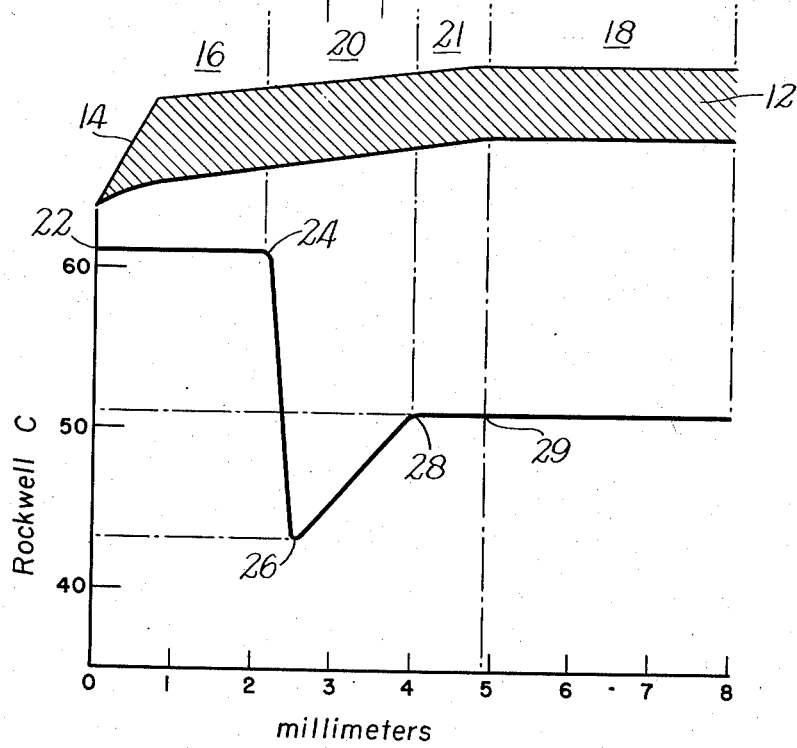
INVENTOR
Bengt Lagerstrom
BY
Curtis, Morris + Safford
ATTORNEYS

United States Patent Office 2,829,684
Patented Apr. 8, 1958

2,829,684

SAW BLADE WITH HARDENED TEETH

Bengt Lagerstrom, Sandviken, Sweden, assignor to Sandvikens Jernverks Aktiebolag, Sandviken, Sweden Application February 16, 1954, Serial No. 410,614

Claims priority, application Sweden September 2, 1953

3 Claims. (Cl. 143—133)

This invention relates to saws and the manufacture thereof, and more in particular to bow saw blades which are used primarily to cut timber and to the manufacture of such blades.

In the past, it has been more or less standard practice to temper bow saw blades and circular saw blades and the like to a uniform hardness throughout with the hardness being selected at a value which is a compromise between the optimum values at the various zones or portions of the saw, that is the body of the blade and the saw teeth. For example, it has been considered that the teeth should be very hard while the body portion of the blade should have a certain amount of flexibility, and the saw has been given a hardness less than the optimum condition of the teeth but greater than that for the body portion.

It has been impractical from a commercial standpoint to provide extremely hard teeth and a less hard body portion, particularly with bow saw blades which are thin and have exceptionally long teeth as compared with some other saws such as metal saws. The reason for this is that with bow saws of the type used in lumbering operations, i. e. to cut trees, the teeth must be given considerable set and the blades of such saws are subjected to considerable squeezing during the sawing operations; and, this tends to break the teeth if they are extremely hard.

It is an object of the present invention to provide saw blades which are free of the objectionable characteristics and which avoid the difficulties which have been encountered in the past. Another object is to provide for the manufacture of saw blades in such a manner as to avoid the difficulties referred to above. It is a further object to provide improved bow saw blades and to provide for the manufacture thereof. These and other objects will be in part obvious and in part pointed out below.

In accordance with the present invention, the body of the saw blades has the optimum hardness for the blade and the tips of the teeth have the optimum hardness for them. Also, each tooth is provided with a somewhat central or intermediate portion which is less hard than the body of the blade. The setting is to be performed behind the intermediate zone of each tooth or this zone may be utilized for setting the tooth and it gives the tooth a certain amount of flexibility, but it still has sufficient resiliency to prevent free bending. Hence, while the teeth may be set and they may be squeezed substantially flat without breaking, when the squeezing forces are released, the teeth tips return to their proper positions.

Referring now to the drawing illustrating one embodiment of the invention:

Figure 1 is a side elevation of a section of a bow saw blade;

Figure 2 is a sectional view on the line 2—2 of Figure 1; and

Figure 3 is an enlarged sectional view on the line 3—3 of Figure 1, together with a diagrammatic representation of the relative hardness between the base and the tip of the saw teeth.

Referring to Figure 1 of the drawing, the illustrative embodiment of the invention is a bow saw blade 2 which has a body portion 4 from which teeth 10 and 12 extend. Teeth 10 and 12 are oppositely sharpened and are positioned alternately with teeth 10 (see Figure 2) being set to the right and with teeth 12 being set to the left. Each tooth is sharpened with a pair of surfaces 14. In the illustrative embodiment, the tooth height is 8 mm. Each tooth may be considered generally as having four portions; namely, the tip portion 16, the base portion 18 and the generally intermediate portions 20 and 21. The portions 18 and 21 of the teeth and the main blade body portion 4 have a hardness which is optimum for those portions; illustratively, for this saw blade, 51 Rockwell C. This hardness gives sufficient rigidity to support the blade and the teeth properly and yet the blade and portions 18 and 21 of the teeth have sufficient resiliency or springiness to permit the desired flexing and bending. The tip portions 16 of the teeth are very hard and have a hardness of 61 Rockwell C. Each of the portions 20 has a zone where the hardness is 43 Rockwell C.

Reference will now be made to Figure 3 where the hardness is related to the length of a tooth 10, i. e., along the center line of the tooth between the extreme tip and center of the base. The abscissae represent distances in millimeters from the extreme tip of the tooth which is positioned at 0. The ordinates represent hardness in terms of the Rockwell C scale. The length of the tip portion of the tooth is slightly greater than 2 mm., and it has a hardness of 61 Rockwell C which is represented on the curve by the line 22—24. The hardness then drops sharply on the curve by the line 24—26 to the zone of minimum hardness of 43 Rockwell C at 26. The hardness then increases gradually through the intermediate portion 20 of the tooth along the line 26—28 to a hardness of 51 Rockwell C. As indicated above, the hardness is at this hardness throughout the portions 21 and 18 of the teeth and the body portion 4 of the saw blade. The teeth are set in the zone indicated at the Figure 3 by the points 29 which is slightly less than 5 mm. from the extreme tip of the teeth. Under some circumstances, a setting may be effected in the portion 20, preferably near point 28.

In this embodiment, the pattern of hardness is obtained by first hardening the entire saw blade and the teeth; then, the tip portions 16 are subjected to a further treating to give them the desired hardness. The treating of the tip portions is carried on in such a manner as to "draw" the hardness somewhat from the intermediate portions 20 so as to reduce the hardness as desired. The final treating of the tip portions 8 may be carried on after the teeth have been sharpened and the setting of the teeth may also be carried on prior to this final treating operation. Under some circumstances, all or some of the setting and sharpening operations are carried on after the final tempering operation. In this particular embodiment, the tip portion 16 of each tooth is substantially one-quarter of the tooth length and the tip portion 16 and intermediate portion 20 are substantially one-half the tooth length. Under some circumstances, the tip portion and the intermediate portion may be greater, for example, two-thirds of the tooth length.

With the arrangement here shown, the teeth may be readily set and yet the tip portions are sufficiently hard to increase their resistance to wear so that frequent resharpening is unnecessary. The intermediate portions 20 of the teeth have sufficient resiliency to permit substantial flattening of the teeth with complete recovery when the flattening forces are released. However, if a tooth is bent, it may be straightened and reset without difficulty.

The illustrative embodiment is in the form of a bow saw blade with relatively long or high teeth and the blade is relatively thin. The particular blade here shown will maintain its sharpness and setting for a long period of normal use. It is contemplated that the blade be discarded when the teeth eventually become worn and dull. With this arrangement, it is possible to provide a very satisfactory saw blade which does not require sharpening and setting services, and yet the over-all cost is not excessive. Illustratively, the blade is .74 mm. thick, and the width of setting is varied between 1.35 mm. and 1.4 mm. With thicker blades, the width of setting is of the order of 1.5 mm. The blade may have a width of the order of 17 mm. to 25 mm. In heat treating the blade just referred to, the original hardening is performed by inductive heating to a temperature of the order of 850° C. to 900° C. The blade is then cooled at a rate to produce the desired hardness, after which it is tempered to improve its ductility and other properties. The tempering takes in the order of four minutes at a temperature of 250° C.

The broader aspects of the invention are applicable to other types of saws; for example, circular saw blades, band saw blades, frame saw blades and manual saws of different types. Under some circumstances, the saw blades are manufactured from cold rolled steel in which case the hardness of 51 Rockwell C may be obtained without further hardening. For certain conditions of use, it is desirable to harden the body of the blade and the base portions 18 of the teeth with the tips of the teeth shielded or insulated.

Some types of saw blades have their body portions tempered to a lesser hardness than that referred to above; namely, within the range between 41 Rockwell C and 53 Rockwell C. The hardness of the tooth tips is also varied depending upon the particular saw blade and the conditions of use, for example, from 58 Rockwell C to 65 Rockwell C. Under some circumstances, the intermediate portions of the teeth, corresponding to portions 20 in the illustrative embodiment, are given a hardness which will permit the resiliency and bendability referred to above with the body portion of the blade being of somewhat greater hardness and with the tip portions being of substantially greater hardness.

I claim:

1. In a narrow, thin, long-tooth saw blade of wood cutting type, a body portion having a hardness of the order of 41 Rockwell C to 53 Rockwell C, and a plurality of relatively long thin teeth integral with said body portion and having a length of approximately ten times their thickness and each having a base portion of substantially the same hardness as said body portion, an intermediate portion of substantially lesser hardness than said body portion and a tip portion which has a hardness which is substantially greater than that of said body portion, said intermediate and tip portions together comprising less than two-thirds of the length of the tooth, the saw teeth being set at the portions of the teeth between the intermediate zone and the body portion, and substantially above the body portion.

2. The structure as in claim 1 wherein said intermediate and tip portions comprise approximately one-half the length of the tooth, the length of the tooth being roughly equal to the width of said body portion.

3. In a narrow, thin, long-tooth saw blade of wood cutting type, a body portion having a hardness of the order of 41 Rockwell C to 53 Rockwell C, and a plurality of relatively long thin teeth integral with said body portion and having a length of more than ⅓ the width of the blade, and each having a base portion of substantially the same hardness as said body portion, an intermediate portion of substantially lesser hardness than said body portion and a tip portion which has a hardness which is substantially greater than that of said body portion, said intermediate and tip portions together comprising less than two-thirds of the length of the tooth, said teeth being set adjacent the base end of the intermediate portions.

References Cited in the file of this patent

UNITED STATES PATENTS

| | | |
|---|---|---|
| 334,567 | Clemson | Jan. 19, 1886 |
| 1,130,649 | Whitaker | Mar. 2, 1915 |
| 2,326,674 | Pavitt | Aug. 10, 1943 |
| 2,327,129 | Roman | Aug. 17, 1943 |
| 2,422,561 | Pavitt | June 17, 1947 |